E. SCHNEIDER.
HYDROPNEUMATIC RECUPERATOR FOR GUNS.
APPLICATION FILED FEB. 14, 1918.

1,318,606.

Patented Oct. 14, 1919.
7 SHEETS—SHEET 2.

Inventor:
Eugène Schneider
By
Mauro, Cameron, Lewis & Massie,
Attorneys.

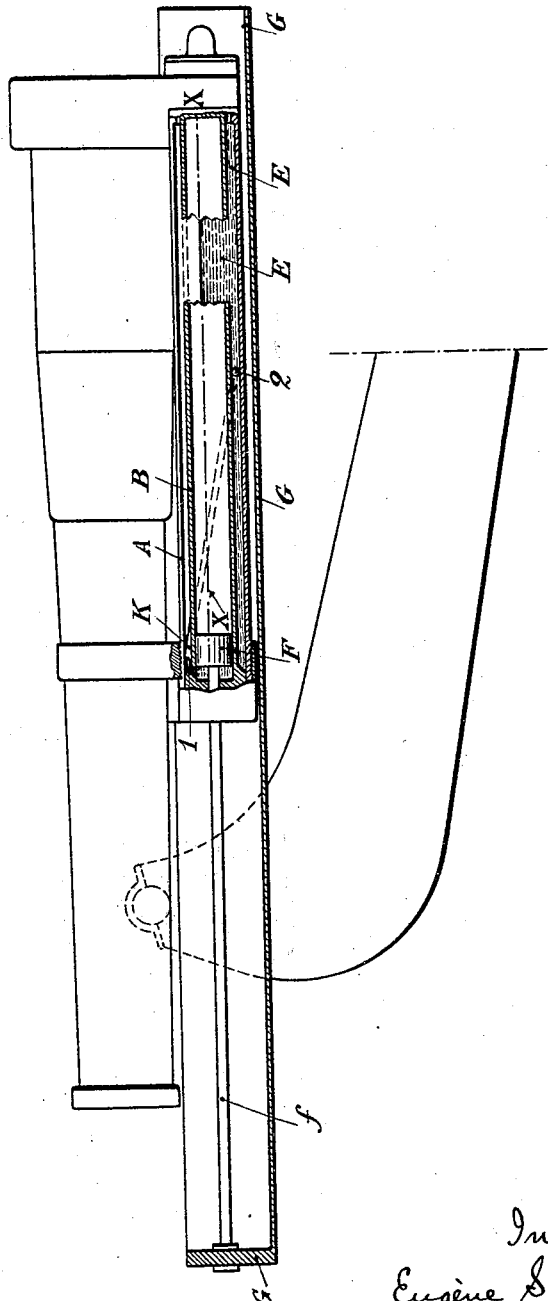

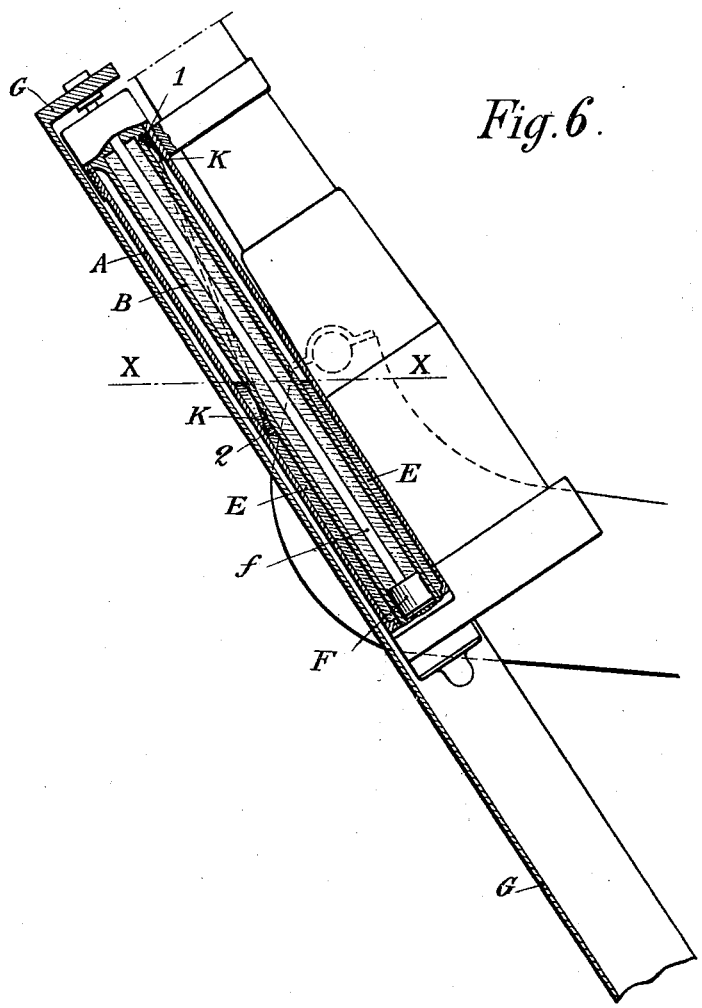

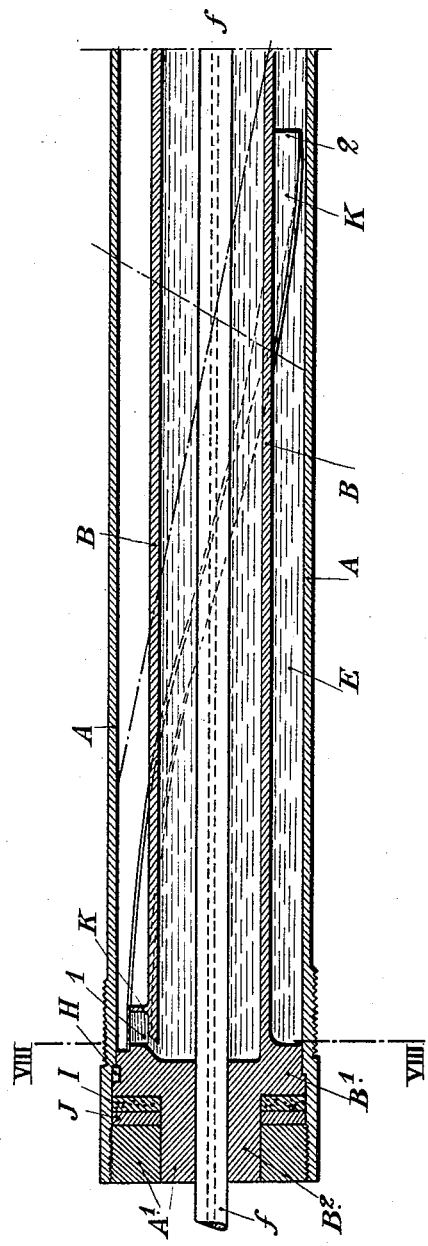

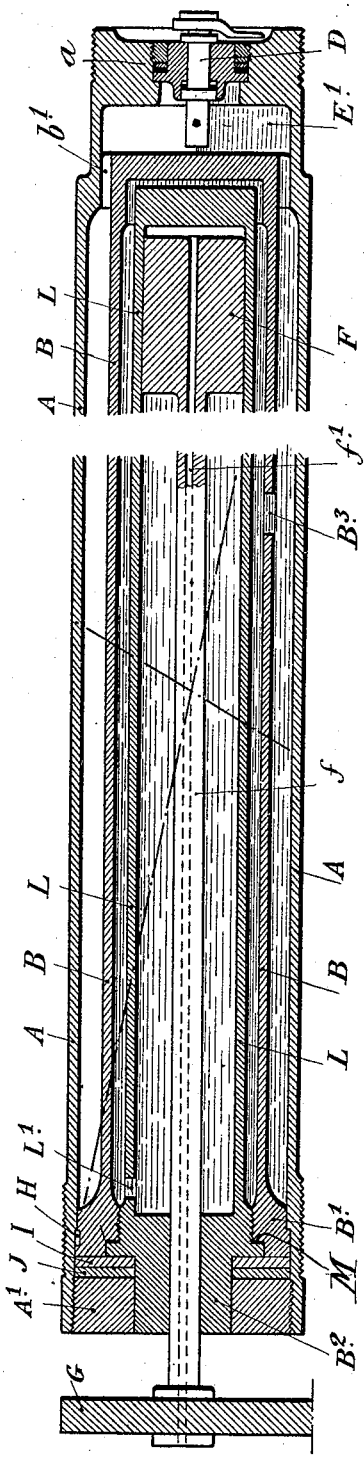

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

HYDROPNEUMATIC RECUPERATOR FOR GUNS.

1,318,606.  Specification of Letters Patent.  Patented Oct. 14, 1919.

Application filed February 14, 1918. Serial No. 217,198.

*To all whom it may concern:*

Be it known that I, EUGÈNE SCHNEIDER, a citizen of the French Republic, and a resident of 42 Rue d'Anjou, Paris, France, have invented new and useful Improvements in Hydropneumatic Recuperators for Guns, which invention is fully set forth in the following specification.

This invention has for its object to provide an improved construction of hydro-pneumatic recuperators for guns, designed to facilitate more particularly the manufacture of such an apparatus, and to constitute the cylinders of said apparatus by means of simple drawn tubes whereof the walls will not require any precision boring for the greater part of their length.

The improved recuperator comprises a cylinder wherein the air or gas is confined under pressure, and which envelops a cylinder constituting a liquid chamber; the whole of the two cylinders being adapted to move in the recoil relatively to a piston working in the enveloped cylinder.

The essential feature of this invention is the enveloped cylinder which is closed at one end (by means of which it is guided in the enveloping cylinder) and is formed near its other end with a shoulder fitting the wall of the enveloping cylinder. The enveloped cylinder is further provided with a sleeve forming a prolongation of its said other end, and serving as a guide for the piston rod, whereby the enveloped cylinder is able to move slightly in the corresponding end of the enveloping cylinder. The result is that the air joint formed between the shoulder of the enveloped cylinder and the end of the enveloping cylinder is made in the manner of the joints of the "movable head" type which allows of rendering the parts perfectly tight.

This invention comprises further in a recuperator of the kind described, a device for insuring that the liquid in the enveloped cylinder shall be forced back exclusively into the body of the liquid in the enveloping cylinder whatever may be the inclination of the gun at the moment of recoil.

Several constructional forms of this invention are illustrated by way of example in the accompanying drawings in which:

Figs 4, 5 and 6 are diagrammatic sectional elevations showing the improved apparatus in various positions of firing and operation.

Fig. 7 is a partial longitudinal section of a modification.

Fig. 9 is a longitudinal axial section of another constructional form of the improved recuperator.

In these various examples, the improved recuperator comprises an enveloping tube A which may be mounted for instance in two collars C and $C^1$ carried by the gun barrel. The rear end $a$ of this enveloping cylinder is closed and may be provided with a charging device D combined if desired with an apparatus for checking the charge of liquid and air. In the cylinder A and coaxial therewith there is fitted an enveloped cylinder B, the closed end $b$ of which may be formed with centering ribs $b^1$ that leave between them spaces for free communication between the annular space E comprised between the cylinders, and the space $E^1$ comprised between their ends $a$ and $b$. Near the other end (the front end in the example shown) of the cylinder, a shoulder $B^1$ is formed having a diameter that is approximately equal to the internal diameter of the enveloping cylinder A. A sleeve $B^2$ constituting an extension of the end $B^1$, is guided by means of its outer surface, in the corresponding end $A^1$ of the enveloping cylinder A, and serves by means of its inner surface as a guide for the rod $f$ of the piston F which is fixed in the usual manner to the gun cradle G.

By means of the sleeve $B^2$, the enveloped cylinder B is able to move slightly in the end $A^1$ of the cylinder A; all rotational movement of the cylinder B being prevented by means of a feather H guided in the corresponding grooves of the cylinder A and the shoulder $B^1$. I and J are jointing washers, for instance composed respectively of hardened rubber and bronze, located between the front edge of the shoulder $B^1$ and the inside face of the end $A^1$, around the sleeve $B^2$. By means of the shoulder $B^1$ and the movability of the sleeve $B^2$ in the end $A^1$, the joint thus formed is constructed in the manner of the "movable head" joint type. The internal pressure per unit of surface acting upon the joint, is always greater than the external pressure, so that a perfect tightness of the joint is always produced.

For the purpose of assuring in a recuperator constructed as above described, that the liquid in the enveloped cylinder B shall be forced back exclusively into the body of the liquid in the enveloping cylinder A, whatever may be the inclination of the gun, the wall of the cylinder B may be formed with a helical duct K starting from the highest point 1 at the end of the cylinder B and opening at a point 2 of the enveloping cylinder A that is always covered with liquid.

Figure 5:
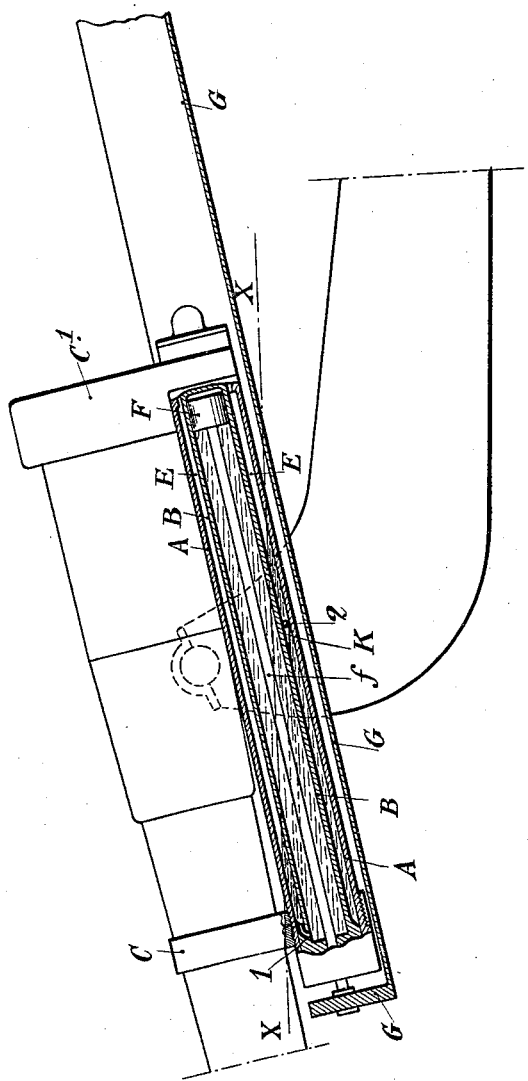

The diagrammatic Figs. 4, 5 and 6 show clearly that the duct K is always full of liquid, whatever may be the inclination of the gun barrel and the positions of the parts during the working of the gun. During the recoil, in all positions, the liquid forced back by the piston F out of the enveloped cylinder B, thus drives in front of it solely liquid which never comes in contact with the air confined above the free level X—X.

The piston and its rod may be pierced with an axial hole $f^1$ (Fig. 1) which will allow, on the gun returning into firing position, the discharge of any air or liquid that may have collected by reason of leakage between the rear side of the piston and the end $b$ of the enveloped cylinder.

Figure 1:
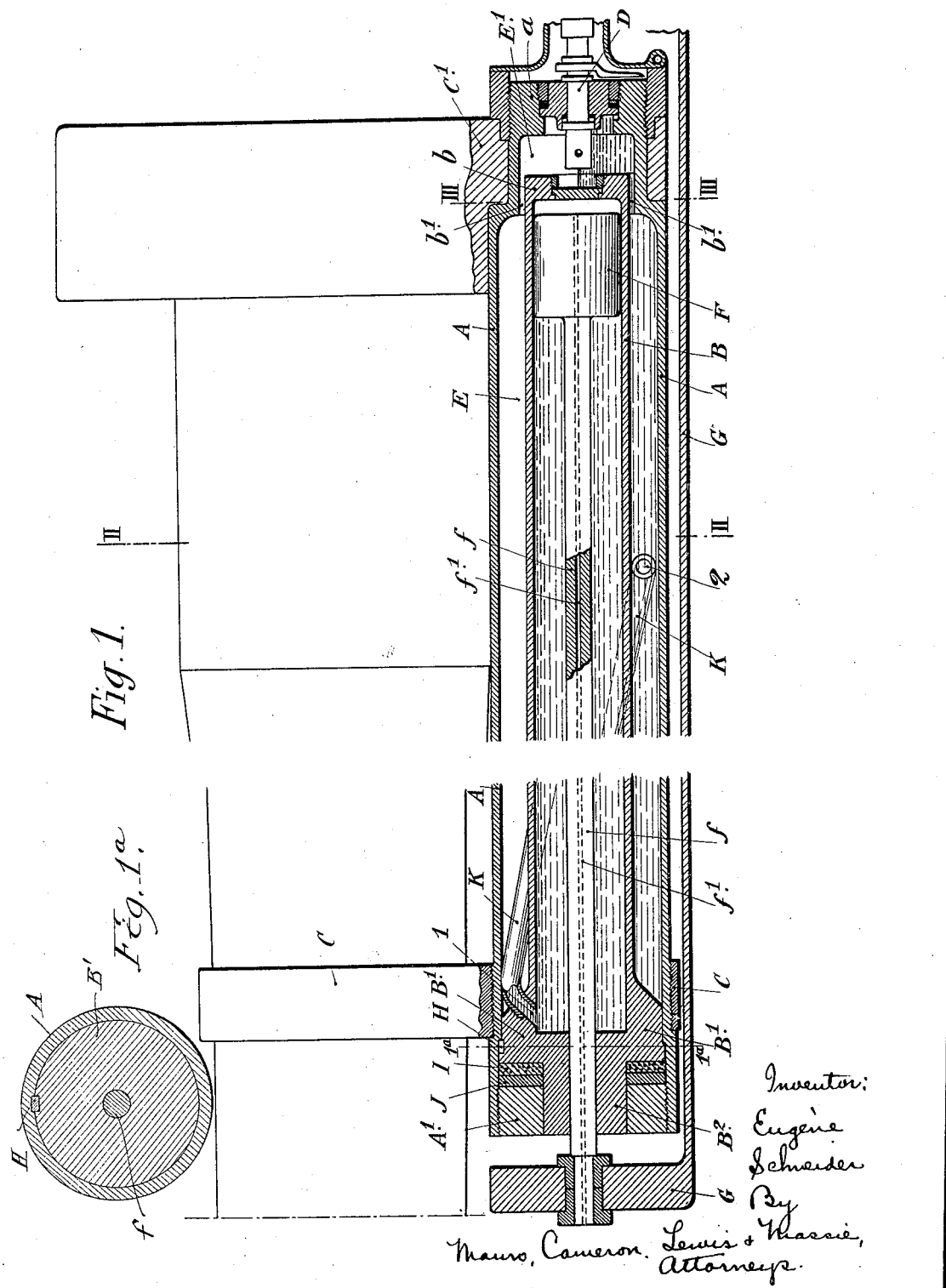
Figure 1 is a longitudinal vertical axial section of a recuperator constructed according to this invention, part of the gun barrel being shown in elevation and Fig. 1ª is a cross-sectional view of Fig. 1 on the line 1ª.
Figure 2:
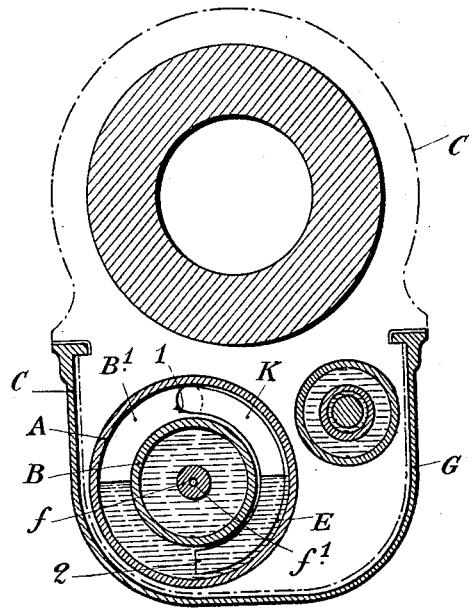
Figs. 2 and 3 are cross sections on the lines II—II and III—III respectively of Fig. 1.
Figure 3:
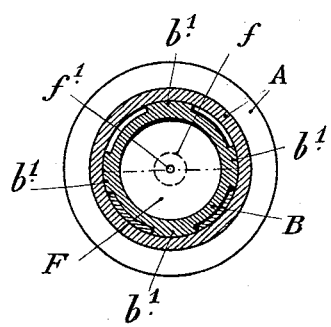

In the example shown in Fig. 1, the duct K consists of a separate and suitably curved tube which is fitted at its ends respectively at the point 1 of the cylinder B and at the point 2 of the cylinder A.

Figure 8:
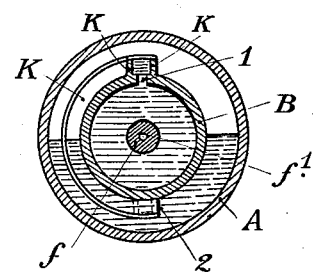
Fig. 8 is a cross section on the line VIII—VIII of Fig. 7.

In the modifications shown in Figs. 7 and 8, the bottom of the duct K is constituted by the outer surface of the cylinder B, and the sides of the duct K are constituted by ribs projecting from the outer surface of the cylinder B, while the top of the duct K may be formed by a strip of sheet metal brazed on to the ribs K.

In the embodiment shown in Fig. 9, the enveloped cylinder is composed of two coaxial sleeves B, L, secured together at their front ends by screw threads to form a water tight joint by aid of a copper washer M for instance. The tube L of smaller diameter in which the piston F—$f$ works, is formed at the highest point of its front end with an orifice $L^1$ to allow the liquid to pass into the tube B of larger diameter. This tube B is formed at a point that is always covered by the liquid, with an orifice $B^3$ establishing communication with the enveloping cylinder A. In this example, the inner cylinder B, L, is always full of liquid, and the operation of the apparatus is assured as in the preceding examples, without the formation of emulsion between the liquid and the air under pressure.

What I claim is:—

1. In a hydro-pneumatic recuperator, a piston cylinder having a shouldered end closure provided with a reduced tubular extension for guiding the piston rod in said cylinder, a hydro-pneumatic cylinder inclosing said piston cylinder and having liquid communication therewith and slidably receiving said shoulder portion, and a packing gland through which said tubular portion works, said gland fitting the end of said hydro-pneumatic cylinder and constituting an abutment for said shoulder portion.

2. A hydro-pneumatic recuperator as claimed in claim 1 wherein a helical duct is located on the outside surface of said enveloped cylinder establishing communication between the highest point at one end of the enveloped cylinder and a central and lower point of said enveloping cylinder.

In testimony whereof I have signed this specification.

EUGÈNE SCHNEIDER.

Witnesses:
ANDRÉ MOSTICKER,
CHAS. P. PRESSLY.

Copies of this patent may be obtained for five cents each, by addressing the "Commissioner of Patents, Washington, D. C."